(12) United States Patent
Welch et al.

(10) Patent No.: US 8,434,323 B2
(45) Date of Patent: May 7, 2013

(54) MOTOR COOLING APPLICATIONS

(75) Inventors: Andrew M Welch, Mt. Wolf, PA (US);
Steven J Estes, York, PA (US); John C Hansen, Spring Grove, PA (US); Steven T Sommer, York, PA (US); Gregory K Beaverson, York, PA (US)

(73) Assignee: Johnson Controls Technology Company, Holland, MI (US)

( * ) Notice: Subject to any disclaimer, the term of this patent is extended or adjusted under 35 U.S.C. 154(b) by 967 days.

(21) Appl. No.: 12/501,644

(22) Filed: Jul. 13, 2009

(65) Prior Publication Data

US 2010/0006262 A1   Jan. 14, 2010

Related U.S. Application Data

(60) Provisional application No. 61/080,658, filed on Jul. 14, 2008.

(51) Int. Cl.
*F25B 31/00* (2006.01)

(52) U.S. Cl.
USPC .................................. 62/505; 62/468; 62/192

(58) Field of Classification Search .................. 62/505, 62/192, 468
See application file for complete search history.

(56) References Cited

U.S. PATENT DOCUMENTS

| | | | | |
|---|---|---|---|---|
| 1,548,517 A * | 8/1925 | Dubrovin | ........................... | 92/78 |
| 1,926,654 A * | 9/1933 | Scholl | ............................ | 62/497 |
| 3,122,894 A * | 3/1964 | Bernhard | ....................... | 62/117 |
| 3,150,277 A * | 9/1964 | Chubb et al. | ..................... | 310/54 |
| 3,188,833 A * | 6/1965 | Robinson | ......................... | 62/505 |
| 3,306,074 A | 2/1967 | Wilson | | |
| 3,388,559 A * | 6/1968 | Johnson | ........................... | 62/224 |
| 3,408,828 A * | 11/1968 | Soumerai et al. | ................ | 62/470 |
| 3,447,335 A * | 6/1969 | Wheeler et al. | ................. | 62/159 |
| 4,182,137 A * | 1/1980 | Erth | ................................ | 62/505 |
| 7,181,928 B2 | 2/2007 | de Larminat | | |
| 7,437,882 B2 | 10/2008 | Matsunaga et al. | | |
| 2002/0002840 A1 | 1/2002 | Nakane et al. | | |
| 2006/0113851 A1 | 6/2006 | Ishihara et al. | | |

FOREIGN PATENT DOCUMENTS

| | | |
|---|---|---|
| DE | 37 29 486 C1 | 12/1988 |
| JP | 60032985 A | 2/1985 |
| JP | 2001095205 A | 4/2001 |
| JP | 2008082623 A | 4/2008 |
| WO | 00/22359 A1 | 4/2000 |
| WO | 2008045413 A2 | 4/2008 |

OTHER PUBLICATIONS

International Search Report and Written Opinion received in PCT/US2010/037894.
"TURBOCOR"; www.turbocor.com/literature/product_literature.html; (accessed Jul. 10, 2009); p. 30.

* cited by examiner

*Primary Examiner* — Ljiljana V. Ciric
*Assistant Examiner* — Alexis Cox
(74) *Attorney, Agent, or Firm* — McNees Wallace & Nurick LLC

(57) ABSTRACT

A cooling system for a motor powering a compressor in a vapor compression system includes a housing enclosing the motor and a cavity located within the housing. A fluid circuit circulates a cooling fluid in the motor, and includes a first connection in the housing to receive cooling fluid and a second connection in the housing to remove cooling fluid. The fluid circuit includes a passageway for cooling fluid positioned in an internal chamber formed in a motor shaft.

18 Claims, 9 Drawing Sheets

MOTOR COOLING APPLICATIONS

CROSS-REFERENCE TO RELATED APPLICATIONS

This application claims priority from and the benefit of U.S. Provisional Application No. 61/080,658, entitled MOTOR APPLICATIONS, filed Jul. 14, 2008, which is hereby incorporated by reference.

BACKGROUND

This application relates generally to the cooling of motors for vapor compression systems incorporated in air conditioning and refrigeration applications.

Vapor compression systems can use more compact motors operating at higher rotational speeds to provide power to components. By using more compact motors, a reduction in the size of the systems can be obtained. In addition, gains in motor efficiency may also be realized at high rotational speeds. However, some challenges associated with operating motors at higher rotational speeds include the generation of friction between the motor shaft and bearings and windage losses. Windage is a frictional force created between the rotating rotor of the motor and the environment surrounding the rotor, typically air or a working media, such as refrigerant vapor in the case of a hermetic driveline. Windage can create heat and reduce the operational efficiency of the motor.

SUMMARY

This application relates generally to the cooling of motors for vapor compression systems incorporated in air conditioning and refrigeration applications.

The present invention relates to a cooling system provided for a motor powering a compressor in a vapor compression system. The cooling system includes a housing enclosing the motor, and a cavity located within the housing. A fluid circuit circulates a cooling fluid in the motor, the fluid circuit having a first connection in the housing to receive cooling fluid, and a second connection in the housing to remove cooling fluid in fluid communication with the loop. The fluid circuit includes a passageway for cooling fluid positioned in an internal chamber formed in a motor shaft.

The present invention further relates to a cooling system for a motor powering a compressor in a vapor compression system. The cooling system includes a housing enclosing the motor, and a cavity located within the housing A fluid circuit circulates a cooling fluid in the motor, the fluid circuit having a first connection in the housing to receive cooling fluid, and a second connection in the housing to remove cooling fluid in fluid communication with the loop. The fluid circuit including a passageway for cooling fluid positioned in an internal chamber formed in a motor shaft, the motor shaft having an insert member inserted inside the motor shaft and the insert member having the internal chamber.

DETAILED DESCRIPTION OF THE EXEMPLARY EMBODIMENTS

Figure 1:
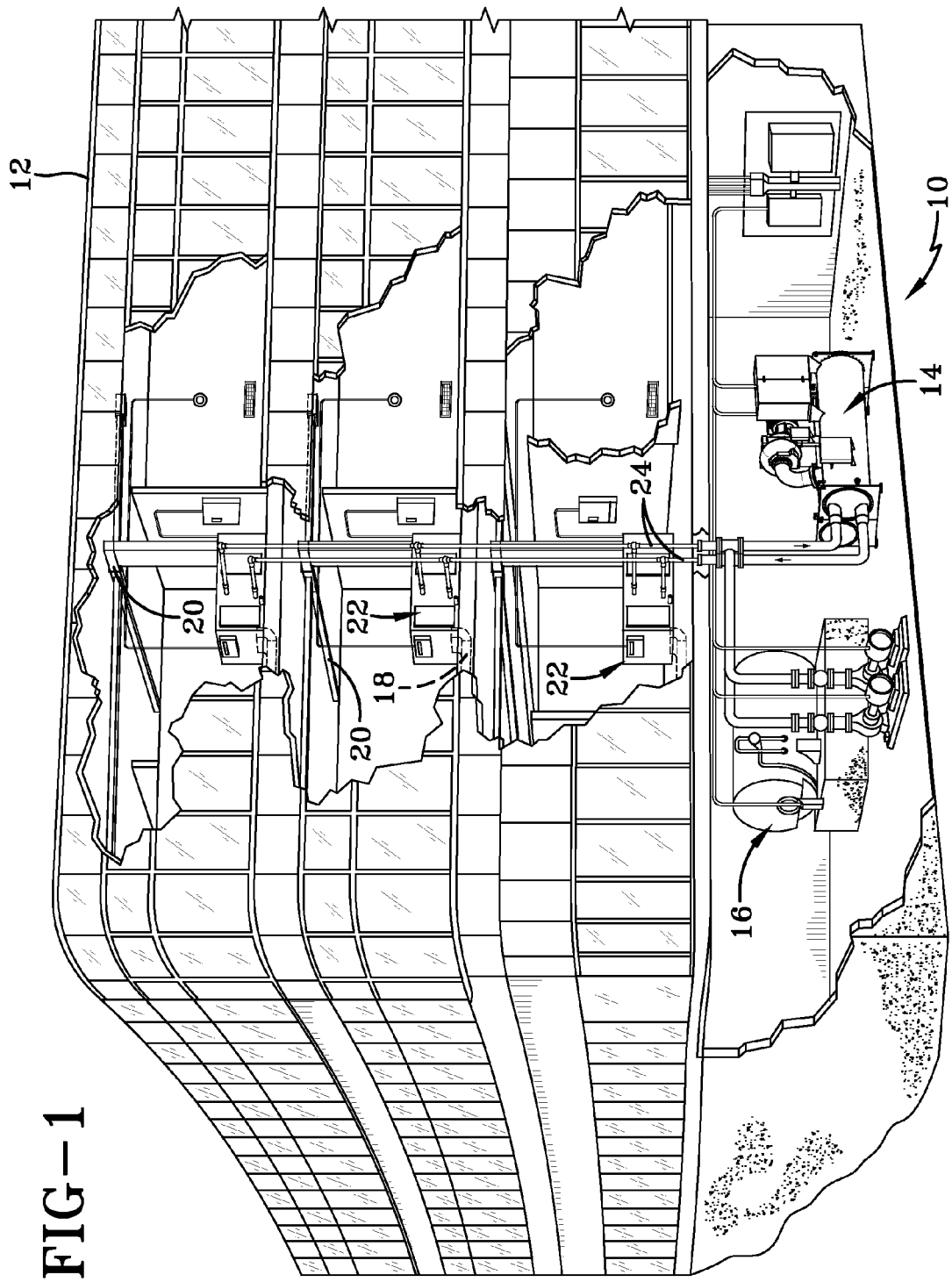
FIG. 1 shows an exemplary embodiment for a heating, ventilation and air conditioning system in a commercial setting.

FIG. 1 shows an exemplary environment for a heating, ventilation and air conditioning (HVAC) system 10 incorporating a chilled liquid system in a building 12 for a typical commercial setting. System 10 can include a vapor compression system 14 that can supply a chilled liquid which may be used to cool building 12. System 10 can include a boiler 16 to supply a heated liquid that may be used to heat building 12, and an air distribution system which circulates air through building 12. The air distribution system can also include an air return duct 18, an air supply duct 20 and an air handler 22. Air handler 22 can include a heat exchanger that is connected to boiler 16 and vapor compression system 14 by conduits 24. The heat exchanger in air handler 22 may receive either heated liquid from boiler 16 or chilled liquid from vapor compression system 14, depending on the mode of operation of system 10. System 10 is shown with a separate air handler on each floor of building 12, but it is appreciated that the components may be shared between or among floors.

Figure 2:
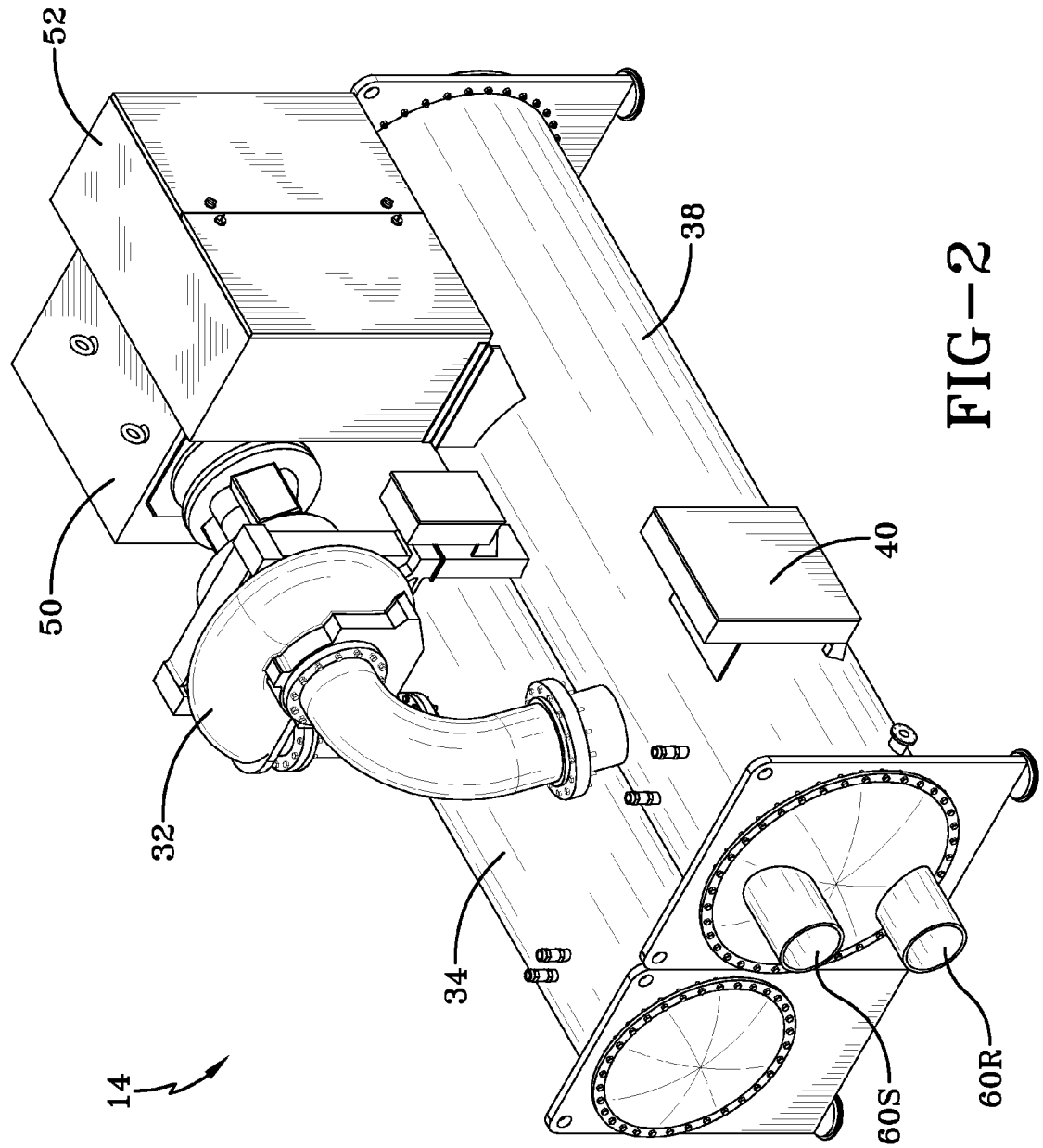
FIG. 2 shows an isometric view of an exemplary vapor compression system.
Figure 3:
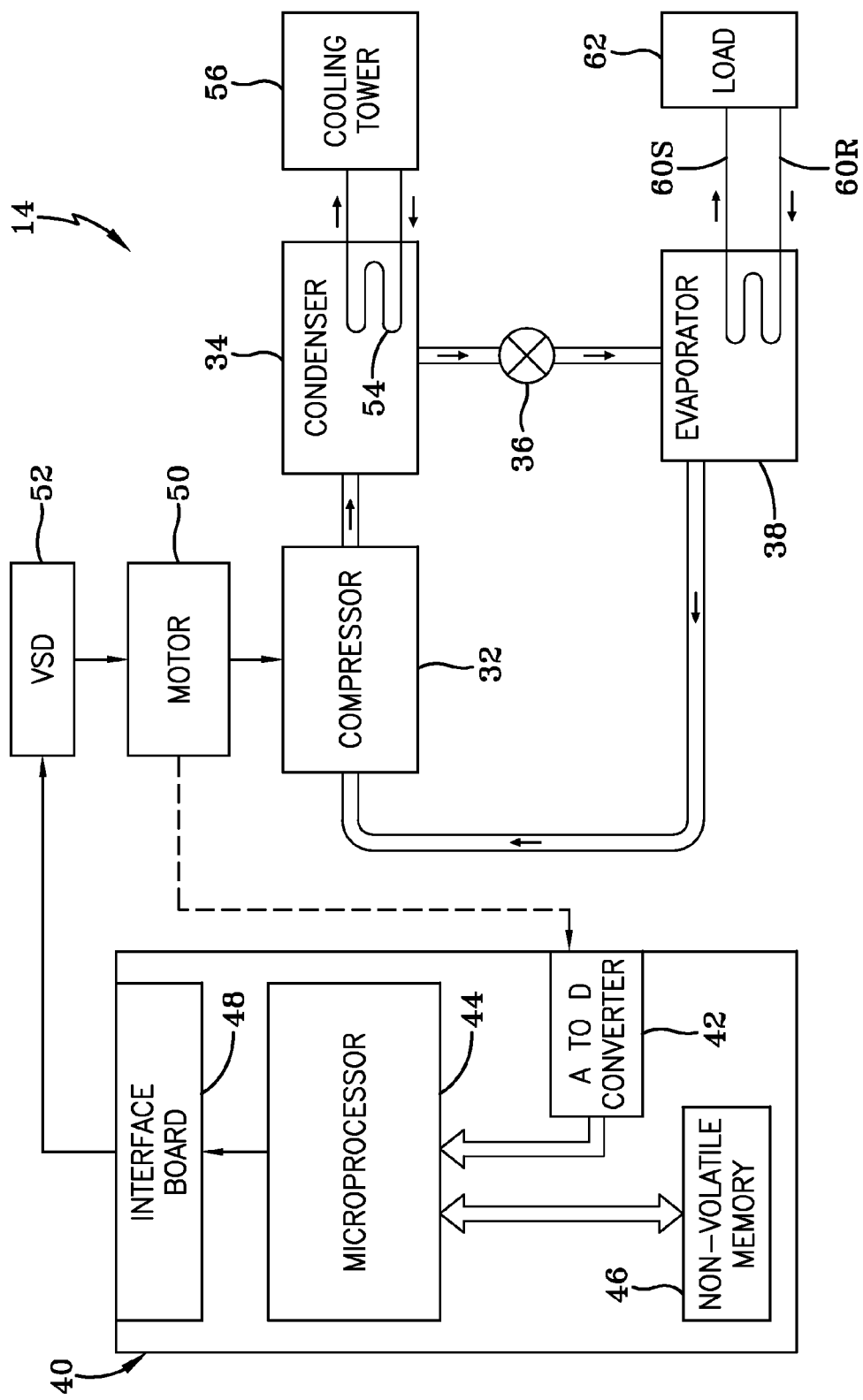
FIGS. 3 and 4 schematically illustrate exemplary embodiments of a vapor compression system.

FIGS. 2 and 3 show an exemplary vapor compression system 14 that can be used in an HVAC system, such as HVAC system 10. Vapor compression system 14 can circulate a refrigerant through a compressor 32 driven by a motor 50, a condenser 34, expansion device(s) 36, and a liquid chiller or evaporator 38. Vapor compression system 14 can also include a control panel 40 that can include an analog to digital (A/D) converter 42, a microprocessor 44, a non-volatile memory 46, and an interface board 48. Some examples of fluids that may be used as refrigerants in vapor compression system 14 are: hydrofluorocarbon (HFC) based refrigerants, for example, R-410A, R-407C, R-134a hydrofluoro olefin (HFO), "natural" refrigerants like ammonia ($NH_3$), R-717, carbon dioxide ($CO_2$), R-744, or hydrocarbon based refrigerants, water vapor or any other suitable type of refrigerant. In an exemplary embodiment, vapor compression system 14 may use one or more of each of variable state drives (VSDs) 52, motors 50, compressors 32, condensers 34 and/or evaporators 38.

Motor 50 used with compressor 32 can be powered by a VSD 52 or can be powered directly from an alternating current (AC) or direct current (DC) power source. VSD 52, if used, receives AC power having a particular fixed line voltage and fixed line frequency from the AC power source and provides power having a variable voltage and frequency to motor 50. Motor 50 can include any type of electric motor that can be powered by a VSD or directly from an AC or DC power source. For example, motor 50 can be a switched reluctance motor, an induction motor, an electronically commutated permanent magnet motor or any other suitable motor type.

Compressor 32 compresses a refrigerant vapor and delivers the vapor to condenser 34 through a discharge line. Compressor 32 can be a centrifugal compressor, screw compressor, reciprocating compressor, rotary compressor, swing link compressor, scroll compressor, turbine compressor, or any other suitable compressor. The refrigerant vapor delivered by compressor 32 to condenser 34 transfers heat to a fluid, for example, water or air. The refrigerant vapor condenses to a refrigerant liquid in condenser 34 as a result of the heat transfer with the fluid. The liquid refrigerant from condenser 34 flows through expansion device 36 to evaporator 38. In the exemplary embodiment shown in FIG. 3, condenser 34 is water cooled and includes a tube bundle 54 connected to a cooling tower 56.

The liquid refrigerant delivered to evaporator 38 absorbs heat from another fluid, which may or may not be the same type of fluid used for condenser 34, and undergoes a phase change to a refrigerant vapor. In the exemplary embodiment shown in FIG. 3, evaporator 38 includes a tube bundle having a supply line 60S and a return line 60R connected to a cooling load 62. A process fluid, for example, water, ethylene glycol, calcium chloride brine, sodium chloride brine, or any other suitable liquid, enters evaporator 38 via return line 60R and exits evaporator 38 via supply line 60S. Evaporator 38 lowers the temperature of the process fluid in the tubes. The tube bundle in evaporator 38 can include a plurality of tubes and a plurality of tube bundles. The vapor refrigerant exits evaporator 38 and returns to compressor 32 by a suction line to complete the cycle or loop.

Figure 4:
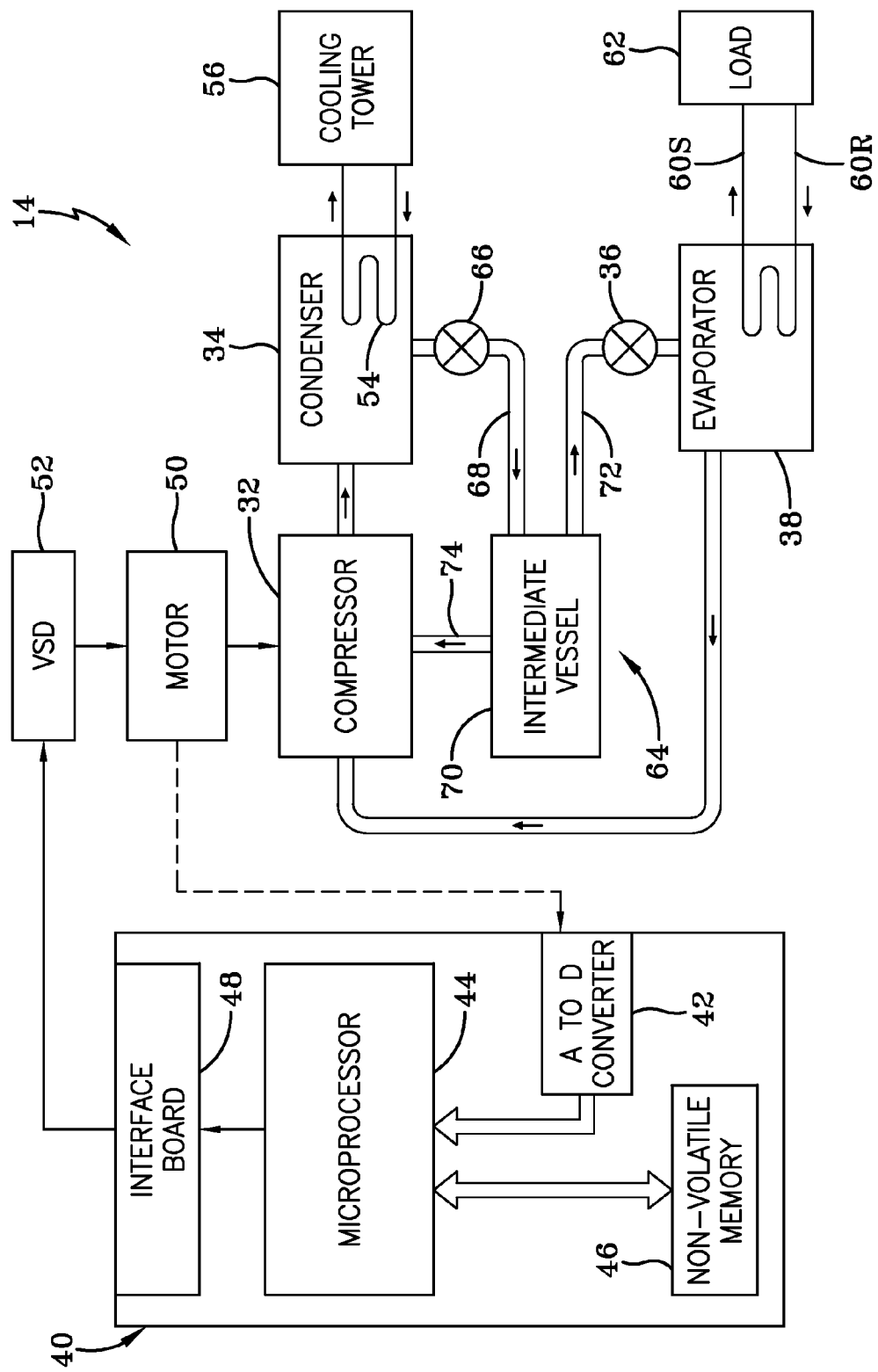

FIG. 4, which is similar to FIG. 3, shows the refrigerant circuit with an intermediate circuit 64 that may be incorporated between condenser 34 and expansion device 36 to provide increased cooling capacity, efficiency and performance. Intermediate circuit 64 has an inlet line 68 that can be either connected directly to or can be in fluid communication with condenser 34. As shown, inlet line 68 includes an expansion device 66 positioned upstream of an intermediate vessel 70. Intermediate vessel 70 can be a flash tank, also referred to as a flash intercooler, in an exemplary embodiment. In an alternate exemplary embodiment, intermediate vessel 70 can be configured as a heat exchanger or a "surface economizer". In the flash intercooler embodiment, a first expansion device 66 operates to lower the pressure of the liquid received from condenser 34. During the expansion process in a flash intercooler, a portion of the liquid is evaporated. Intermediate vessel 70 may be used to separate the evaporated vapor from the liquid received from condenser 34. The evaporated liquid may be drawn by compressor 32 to a port at a pressure intermediate between suction and discharge or at an intermediate stage of compression, through a line 74. The liquid that is not evaporated is cooled by the expansion process, and collects at the bottom of intermediate vessel 70, where the liquid is recovered to flow to the evaporator 38, through a line 72 having expansion device 36.

In the "surface economizer" or "surface intercooler" arrangement, the implementation is slightly different, as known to those skilled in the art. Intermediate circuit 64 can operate in a similar matter to that described above, except that instead of receiving the entire amount of refrigerant from condenser 34, as shown in FIG. 4, intermediate circuit 64 receives only a portion of the refrigerant from condenser 34 and the remaining refrigerant proceeds directly to expansion device 36 (not shown).

Figure 5:
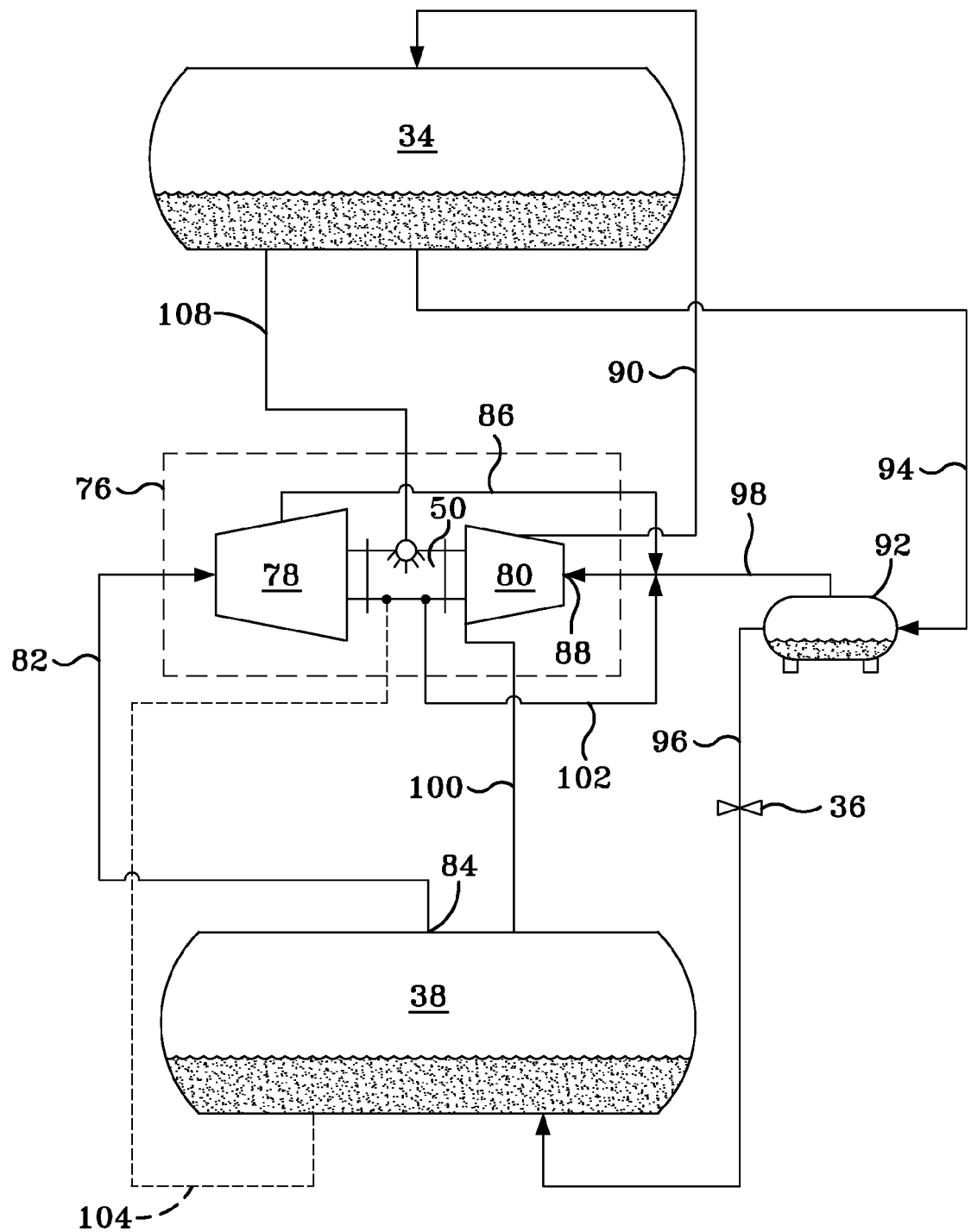
FIG. 5 schematically illustrates an exemplary embodiment of a cooling system for a multi-stage vapor compression system.

In FIG. 5, a multi-staged compressor system is shown. The multi-stage compressor 76 includes a first compressor 78 and a second compressor 80. First compressor 78 and second compressor 80 are positioned on opposite ends of motor 50, which powers or drives each of compressors 78, 80. Vapor refrigerant is drawn into first compressor 78 through refrigerant line 82. Refrigerant line 82 is supplied by a discharge line 84 of evaporator 38. The vapor refrigerant is compressed by first compressor 78, and discharged into an interstage crossover line 86. Interstage crossover line 86 is connected at an opposite end to a suction line 88 of second compressor 80. The refrigerant is further compressed in second compressor 80 for output in compressor discharge line 90, and supplied to condenser 34, where the compressed vapor refrigerant is condensed into a liquid. In the exemplary embodiment shown in FIG. 5, an optional economizer vessel 92 is inserted into a liquid refrigerant path 94, 96, and the vapor flow line 98 is connected to suction line 88, for providing intermediate pressure refrigerant to second compressor 80, to increase the efficiency of the refrigeration cycle. A source of motor cooling is provided by connecting evaporator 38 to an air gap inside motor 50 inside of hermetic or semi-hermetic compressor 76, through a second refrigerant vapor line 100. Vapor line 100 is in fluid communication with the interior of motor 50, and provides refrigerant at a reduced pressure relative to suction inlet 88 of second compressor 80. In an exemplary embodiment, motor 50 may prevent the cooling vapor to interstage crossover line 86 or a location in fluid communication with interstage crossover line 86, through a vent line 102. The location of the vent line connection determines or establishes the intermediate pressure level in the motor cavity.

In an alternate exemplary embodiment, motor 50 may fit into the cooling vapor back to evaporator 38 through alternate vent line 104, instead of vent line 102. Alternate vent line 104 may be used, for example, in an embodiment where a perfect or nearly perfect seal can be achieved between compressor stages 78, 80 and the motor cavity; in such an embodiment, a minimal loss can correspond with a minimum pressure within the motor cavity, the minimal loss realizable by venting to evaporator 38 through alternate vent line 104. Also, in the case of a single stage compressor 76, motor 50 and the motor cavity may be cooled by a similar method, for example, by venting motor 50 to evaporator 38.

In one exemplary embodiment, liquid refrigerant from condenser 34 may be expanded to vapor to provide motor cooling, as indicated by coolant supply line 108 (FIG. 5), and venting back to an intermediate pressure location, for example, second stage suction inlet 88, first stage discharge or interstage cross-over line 86, or economizer vessel 92.

FIGS. 6A, 6B, 7A and 7B depict a portion of a motor cooling system including a cross section of motor 50. Motor 50 comprises a motor housing 112 that includes a motor cavity 120, a stator 142 and a rotor 132 secured to a motor shaft 118 that extends through motor housing 112. One or more sets of electromagnetic bearings 138 radially support motor shaft 118 to significantly reduce sliding friction between the shaft and motor housing 112, although other types of bearings may also be used. Thrust bearings to react to axially directed loads are not shown for clarity. At least one compressor impeller 122 is attached to at least one end of motor shaft 118. FIGS. 6A, 6B, 7A and 7B further illustrate a fluid circuit 106 for cooling components contained in motor cavity 120 of compressor motor 50. Fluid circuit 106 provides a refrigerant fluid from condenser 34 via a conduit 108 that is inserted into an opening 110 formed in a motor housing 112. Conduit 108 further extends into a chamber 114 formed in one end of motor shaft 118 opposite impeller 122. The fluid introduced through opening 110 and into chamber 114 via conduit 108 is directed into chamber 114 from the end of the conduit which defines a nozzle 116.

Figure 6A:
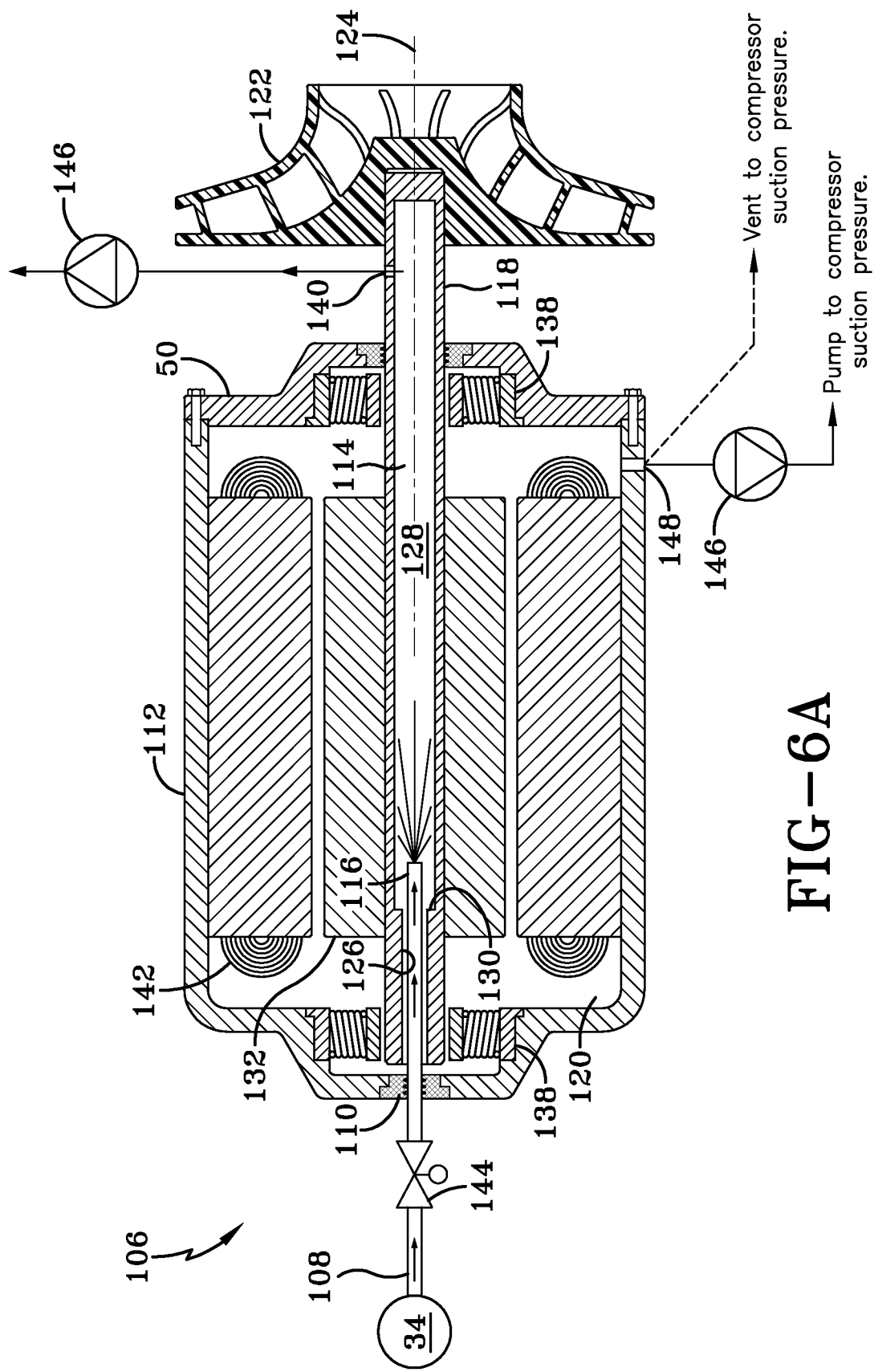
FIGS. 6A, 6B, 7A and 7B illustrate exemplary embodiments of motor cooling systems.

Chamber 114 includes a first portion 126 and a second portion 128. As shown in FIG. 6A, first portion 126 has a cross-sectional area (perpendicular to rotational axis 124) that is less than the cross-sectional area of second portion 128. In an exemplary embodiment, the cross-sectional areas of the portions are circular, but can define other profiles. A shoulder 130, or region of reduced cross-sectional area, is positioned or located at the juncture between first and second portions 126, 128. Shoulder 130 helps retain fluid in second portion 128, since the larger cross-sectional area of second portion 128 can hold more fluid cooled motor shaft 118 and rotor 132. In an exemplary embodiment, shoulder 130 can be movable along axis 124 to separate first portion 126 from second portion 128 and selectably control the length of the second portion and can be composed of a material different than motor shaft 118. Controlling the length of second portion 126 that will contain cooling fluid may permit more effective cooling motor by confining the fluid along regions of motor shaft 118 having a greater temperature gradient. In such an embodiment, first and second portions 126, 128 can have similarly sized, if not identical cross-sectional areas, with shoulder 130 providing a reduced cross-sectional area between the first and second portions.

Second portion 128 can extend through motor shaft 118 toward compressor impeller 122. And this exemplary embodiment, second portion 128 can extend exterior of motor housing 112. As shown in FIG. 6A, an end of shaft 118 opposite first portion 126 extends into compressor impeller 122 and is secured to the impeller. Second portion 128 can also extend through motor shaft 118 to compressor impeller 122. An opening 140 can be formed in shaft 118 between motor housing 112 and compressor impeller 122 to connect to second portion 128 and return liquid refrigerant from fluid circuit 106 to chilled liquid system 10.

For example, as further shown in FIG. 6A, refrigerant fluid provided via nozzle 116 into second portion 128 is in a heat transfer relationship with motor shaft 118 and rotor 132, as well as first portion 126. During operation of motor 50, in which shaft 118 is rotated about axis 124, centrifugal forces direct the refrigerant fluid radially outward into contact with the surface of second portion 128. By virtue of shoulder 130, the length of second portion 128 can be controlled to more effectively provide cooling to the motor by confining the cooling refrigerant fluid along regions of motor shaft 118 having a greater temperature gradient.

Figure 6B:
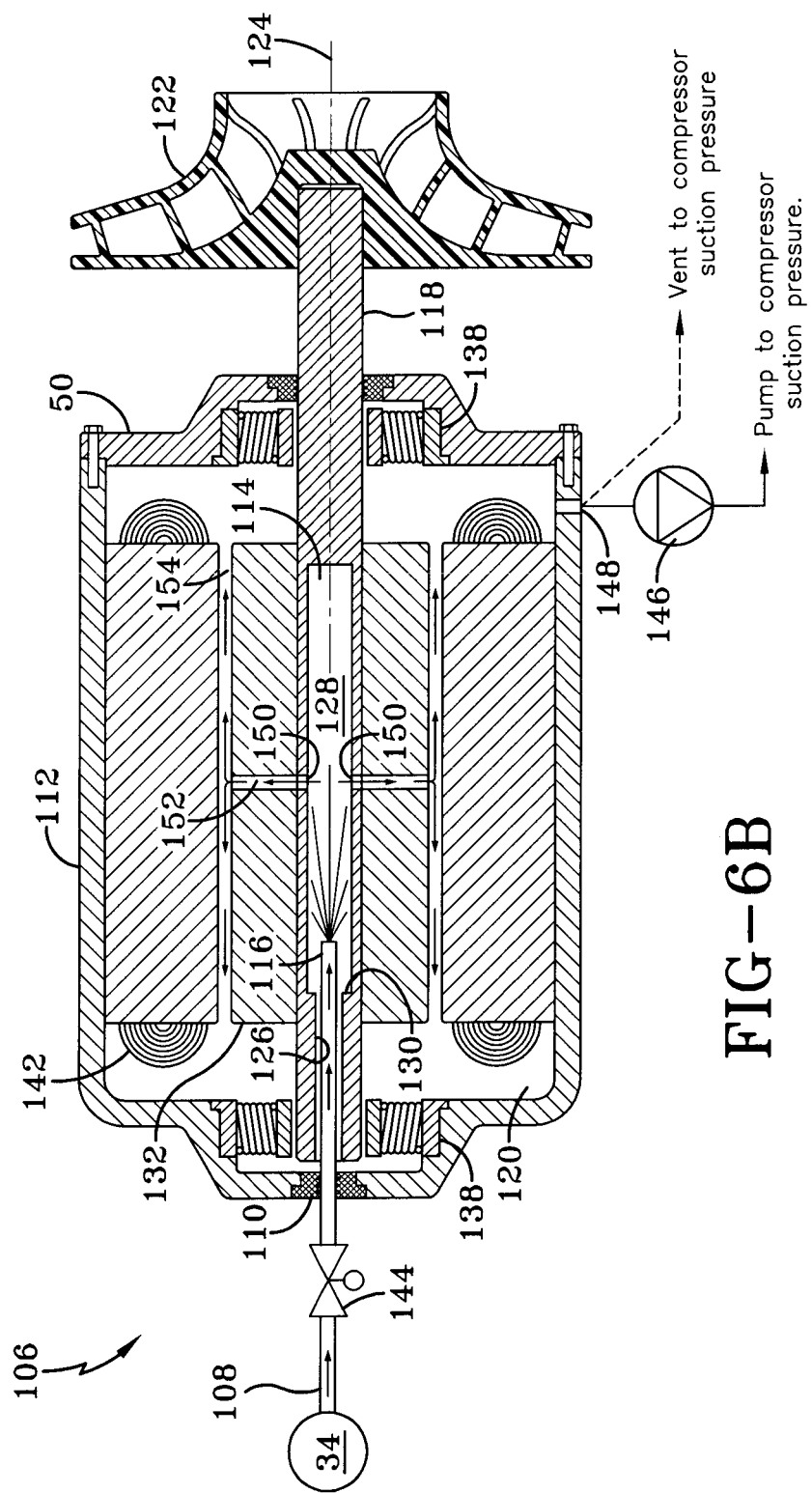
Figure 7A:
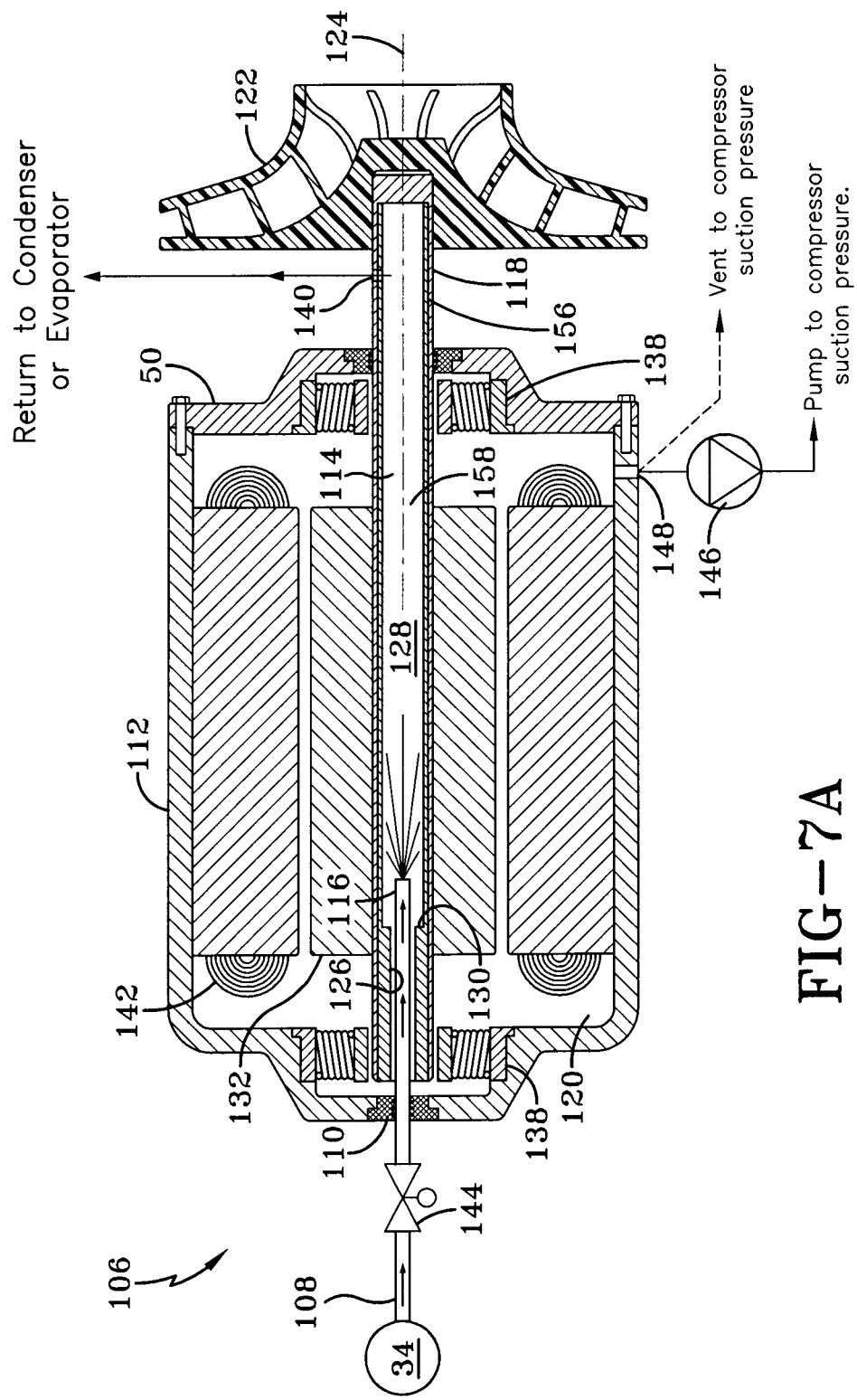
Figure 7B:
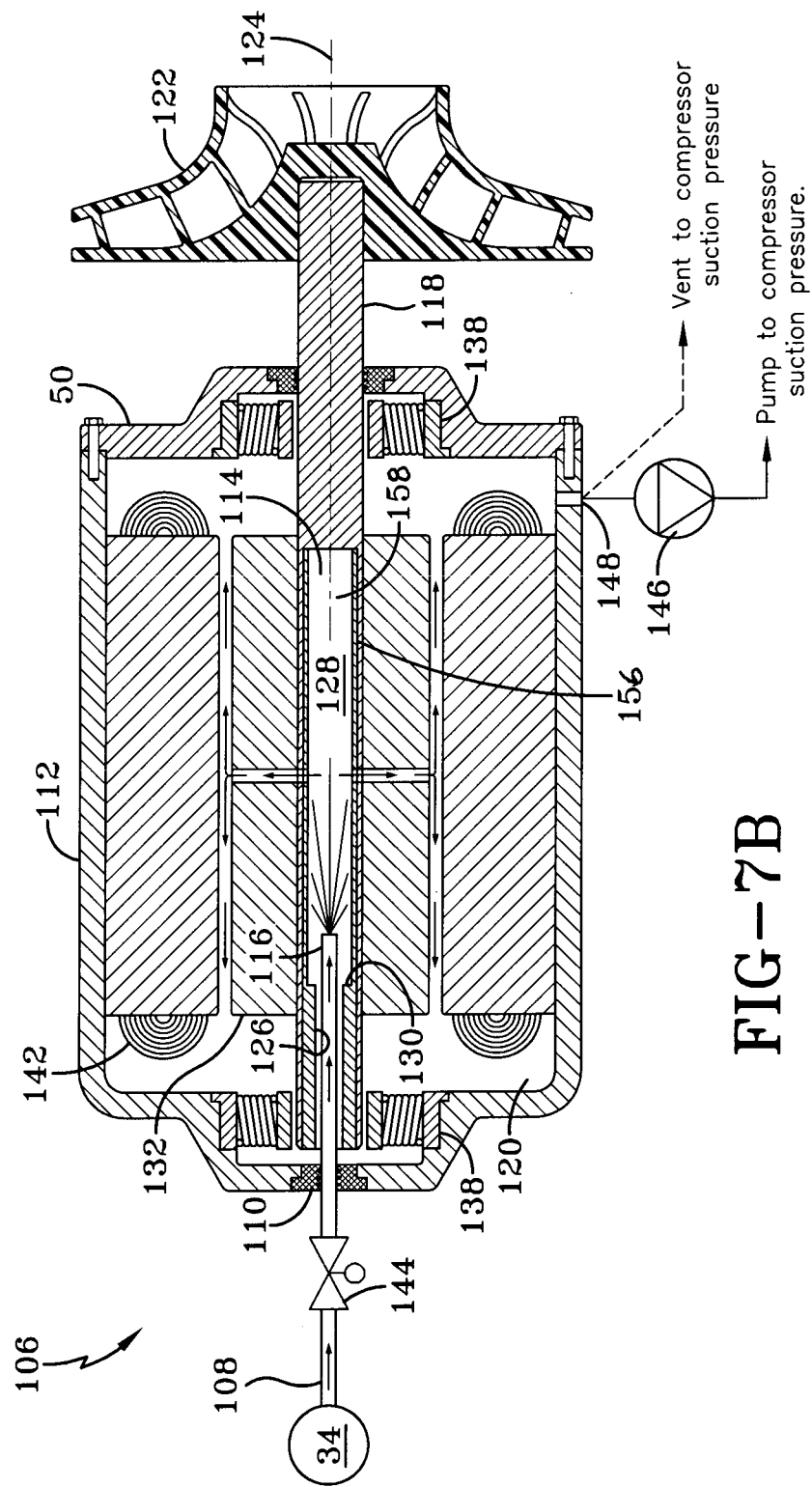

As further shown in FIGS. 6B and 7B, subsequent to cooling motor 50 and impeller 122, the fluid passing through opening 140 forming part of fluid circuit 106 can return to condenser 34, evaporator 38 or compressor 32 suction of chilled liquid system 10.

To further clarify, for FIGS. 6A, 6B, 7A and 7B, the cooling fluid requires a pressure difference in order to be circulated through motor 50. One way to achieve the pressure difference is to provide fluid (for example refrigerant), and expand the fluid using an expansion device, whether fixed or modulating, for example, control device 144 in FIG. 6A. in an alternate exemplary embodiment, a venturi device may be placed in close proximity of nozzle 116 (not shown). If the fluid is provided at a sufficiently high pressure difference through motor 50, for example, between the condenser pressure and compressor suction pressure, a pump 146 should not be required to circulate the fluid through motor 50.

In order to minimize windage in motor cavity 120, an opening 148 may be formed in motor housing 112, permitting refrigerant fluid to be vented to compressor 32 suction in one exemplary embodiment. In a further exemplary embodiment, a control device 146, such as a pump, can be placed in fluid communication with opening 148 to draw refrigerant fluid from motor housing 112 and then provide the refrigerant vapor to compressor 32 suction to reduce motor cavity pressure and windage.

As shown in FIG. 6B, which is similar to FIG. 6A, openings 150 may be formed in second portion 128 of chamber 114 to provide refrigerant fluid to motor cavity 120. Passageways 152 are formed in rotor 132 and aligned with openings 150, with the openings maintaining a spacing 154 between rotor 132 and motor stator 142. This arrangement permits refrigerant fluid in second portion 128 to flow through openings 150, passageways 152 and then spacing 154 to reach motor cavity 120 to achieve cooling in motor 50, in addition to cooling motor shaft 118. In an exemplary embodiment, openings may be formed in first portion 126 of chamber 114 (upstream of rotor 132) to provide refrigerant fluid directly to motor cavity 120. In a further exemplary embodiment, openings may be formed in second portion 128 (downstream of rotor 132, yet still interior of motor housing 112) to provide refrigerant fluid directly to motor cavity 120.

FIGS. 7A and 7B illustrate embodiments similar to respective FIGS. 6A and 6B, except with the addition of insert member 156 composed of a material different than shaft 118 and inserted in a bore 158 of shaft 118. In an exemplary embodiment, bore 158 may be configured similar to that of chamber 114. Insert member 156 includes a first portion 160 and a second portion 162 similar to that of first portion 126 and second portion 128 of shaft 118 as shown in FIGS. 6A and 6B. Insert member 156 may be composed of a material having improved heat transfer properties, such as stainless steel, aluminum, copper or other metal or nonmetal material to cool shaft 118 and other components of the motor.

In an exemplary embodiment (not shown), a portion of refrigerant fluid provided to the motor may be delivered directly to motor housing 112, in addition to that provided via conduit 108 directly to chamber 114 of motor shaft 118.

While the exemplary embodiments illustrated in the figures and described are presently preferred, it should be understood that these embodiments are offered by way of example only. Accordingly, the present application is not limited to a particular embodiment, but extends to various modifications. The order or sequence of any processes or method steps may be varied or re-sequenced according to alternative embodiments.

It is important to note that the construction and arrangement of the systems as shown in the various exemplary embodiments is illustrative only. Although only a few embodiments have been described in detail in this disclosure, those skilled in the art who review this disclosure will readily appreciate that many modifications are possible (for example, variations in sizes, dimensions, structures, shapes and proportions of the various elements, values of parameters, mounting arrangements, use of materials, colors, orientations, etc.) without materially departing from the novel teachings and advantages of the subject matter. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. Other substitutions, modifications, changes and omissions may be made in the design, operating conditions and arrangement of the exemplary embodiments without departing from the scope of the present application.

What is claimed is:

1. A cooling system for a motor powering a compressor in a vapor compression system, the cooling system comprising:
   a housing enclosing the motor, and a cavity located within the housing;
   a fluid circuit to circulate a cooling fluid in the motor, the fluid circuit having a first connection in the housing to receive cooling fluid, and a second connection in the housing to remove cooling fluid in fluid communication with the fluid circuit; and
   the fluid circuit comprising a passageway for cooling fluid positioned in an internal chamber formed in a motor shaft, the motor shaft having an insert member inserted inside the motor shaft and the insert member having the internal chamber.

2. The system of claim 1, wherein the insert member is composed of a material different from the motor shaft.

3. The system of claim 1, comprising a control device located in fluid communication between the cavity and the fluid circuit.

4. The system of claim 3, wherein the control device is a pump.

5. The system of claim 1, wherein the first connection includes a conduit extending into the cavity, through a first portion and into a second portion of the internal chamber.

6. The system of claim 5, wherein the conduit terminates at a nozzle.

7. The system of claim 1, wherein the internal chamber includes a first portion having a first cross-sectional area and a second portion having a second cross-sectional area different from the first cross-sectional area, there being a boundary between the first portion and the second portion.

8. The system of claim 7, wherein an opening is formed in the second portion of the internal chamber in fluid communication with the cavity.

9. The system of claim 7, wherein an opening is formed in the second portion of the internal chamber in fluid communication with the fluid circuit exterior of the housing.

10. The system of claim 7, wherein a passageway is formed in a rotor portion surrounding the motor shaft in fluid communication with the opening of the second portion of the internal chamber.

11. The system of claim 7, wherein the second cross-sectional area is greater than the first cross-sectional area.

12. The system of claim 7, wherein the second portion of the internal chamber extends interior of an impeller secured at one end of the motor shaft and exterior of the housing.

13. The system of claim 12, wherein the boundary between the first portion and the second portion of the internal chamber is moveable within the internal chamber.

14. The system of claim 12, wherein the insert member includes a first portion having a first cross-sectional area and a second portion having a second cross-sectional area.

15. The system of claim 14, wherein an opening is formed in the second portion of the insert member in fluid communication with the fluid circuit exterior of the housing.

16. The system of claim 14, wherein a passageway is formed in a rotor portion surrounding the motor shaft in fluid communication with the opening of the second portion of the insert member.

17. The system of claim 14, wherein an opening is formed in the second portion of the insert member in fluid communication with the cavity.

18. The system of claim 17, wherein the insert member is composed of a material different from the motor shaft.

* * * * *